Feb. 24, 1931.                R. S. HARTMAN                1,793,851
                               HOISTING TRUCK
                          Filed June 20, 1929          4 Sheets-Sheet 1
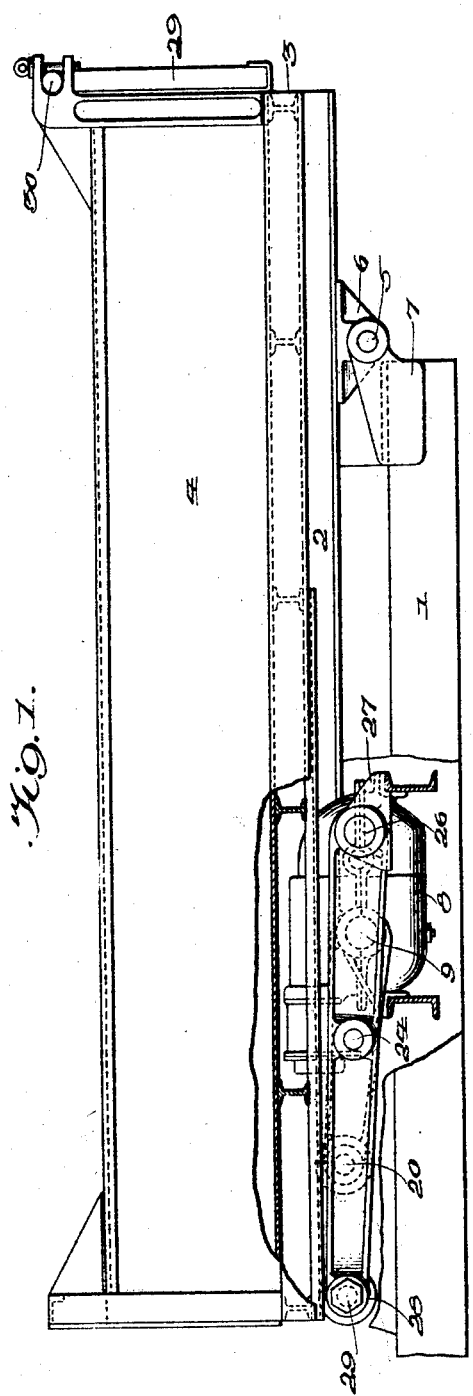
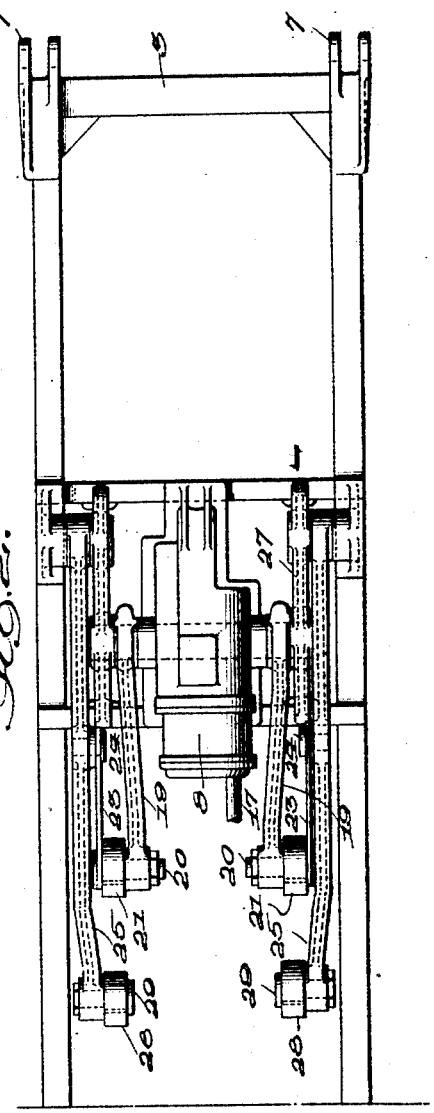
Inventor
Rush S. Hartman,
By O'Neill & Bunn
Attorneys

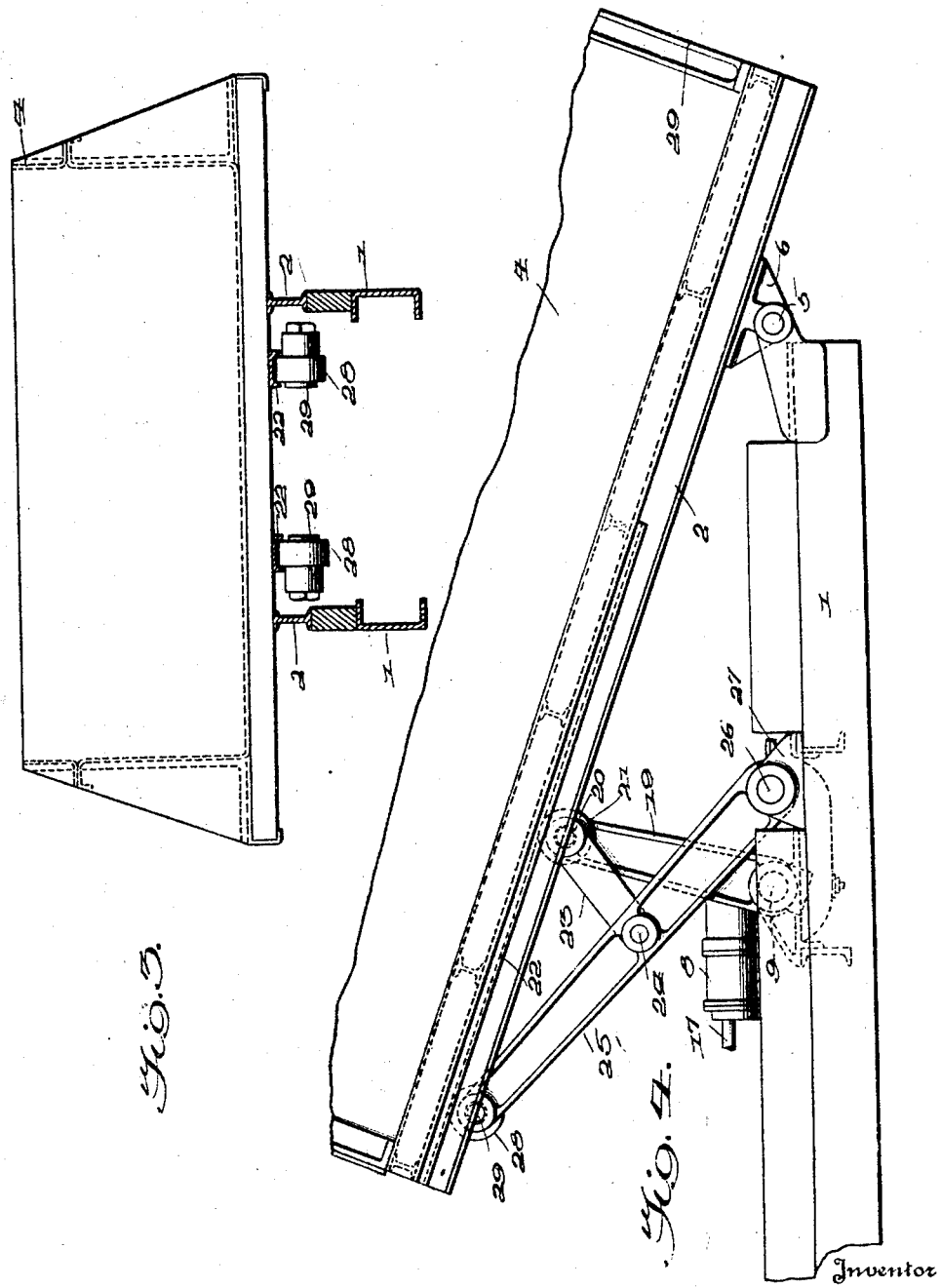

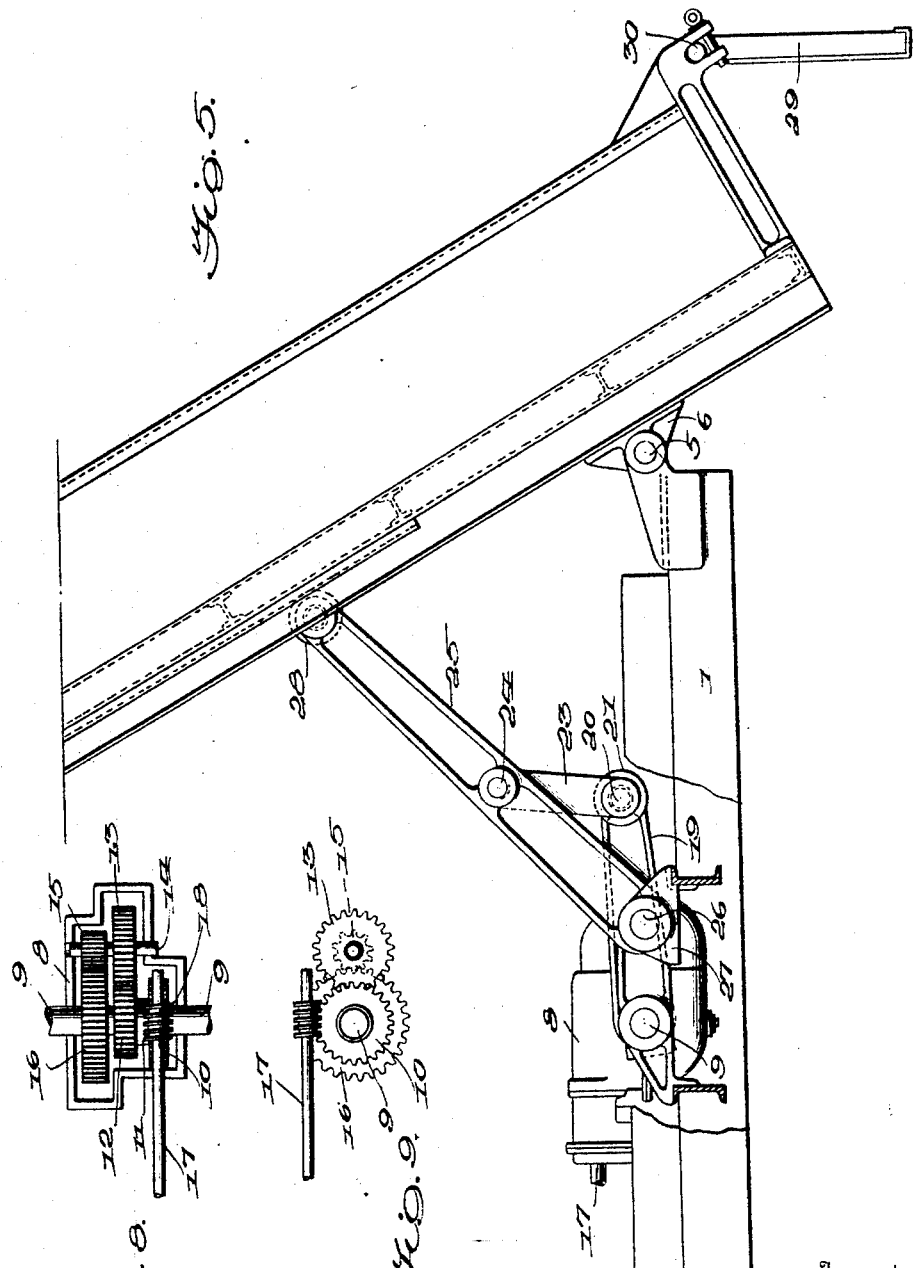

Feb. 24, 1931.　　　R. S. HARTMAN　　　1,793,851
HOISTING TRUCK
Filed June 20, 1929　　　4 Sheets-Sheet 4
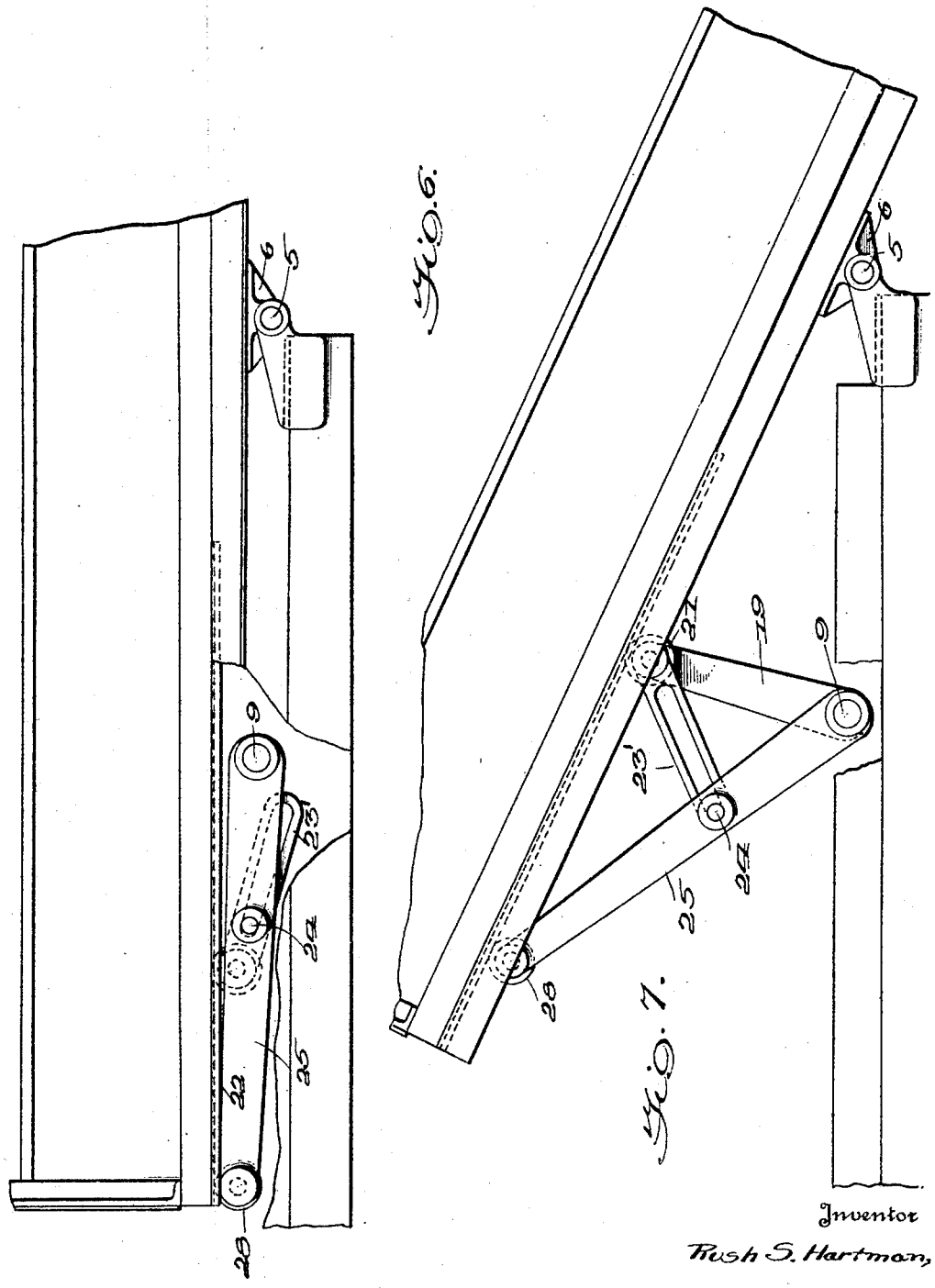
Inventor
Rush S. Hartman,
By O'Neill
Attorneys Patented Feb. 24, 1931

1,793,851

UNITED STATES PATENT OFFICE

RUSH S. HARTMAN, OF TRENTON, NEW JERSEY

HOISTING TRUCK

Application filed June 20, 1929. Serial No. 372,418.

The invention relates to a dumping truck of the type having a body pivoted at the rear of the vehicle frame or chassis and has for its object to provide a novel form of operating gear for swinging the body to and from tilted position, which will be effective in substantially equalizing the application of energy throughout the tilting movement of the body.

The invention is illustrated in the accompanying drawings, in which:—

Fig. 1 is a side elevation showing the truck body resting on the frame, and the lifting mechanism under the body, a portion of the side rails of the body and chassis frame being broken away to better disclose said mechanism.

Fig. 2 is a plan view showing the lifting mechanism, the body of the truck being removed.

Fig. 3 is an elevation of the front end of the body, showing a portion of the lifting mechanism.

Fig. 4 is a side elevation, showing the body in partly raised and tilted position.

Fig. 5 is a similar view showing the body completely tilted.

Fig. 6 is a side elevation, with the body in its lowermost position, showing a modified form of lever connections.

Fig. 7 is a similar view showing the body partially tilted.

Fig. 8 is a top plan view of a train of gears used in operating the levers to swing the body, and, Fig. 9 is a side elevation of said gears.

Referring to Figs. 1 to 5 of the drawings, 1 indicates the chassis or frame of the truck on the rear corners of which are secured brackets 7, 7 carrying pivot pins 5, 5, which engage brackets 6, 6 mounted on the under side of the longitudinal sills 2 of the truck body, which sills normally rest on the side members of the frame 1, when the body is in lowered position.

Mounted on cross rails of the body 1 is a gear casing 8, containing a set of reducing gearing as illustrated in Figs. 8 and 9. A shaft 9 extends through the casing, and carries a worm gear 10, provided with an integrally formed hub portion 11, to which is rigidly secured a pinion gear 12, in mesh with a larger gear 13, the worm gear with its integral hub and pinion being free to rotate on said shaft 9, the gear 13 being mounted on and rigidly secured to intermediate gear shaft 14, journaled in the casing, and also carrying a small gear pinion 15, which is also rigidly secured to said intermediate gear shaft and in mesh with a gear 16 of larger size, gear 16 being mounted on and rigidly secured to shaft 9. Also extended into the casing 8 is a drive shaft 17, carrying at its inner end a worm 18, in mesh with the worm gear 10 on the shaft 9, the outer end of the shaft 17 being extended to a point convenient for access by the operator, and being equipped for manual operation, or provided with operative connections to the motor of the truck, as will be understood. The specific gearing herein described forms no part of the present application. It is to be observed however that the provision of such gearing causes a rotation of the shaft 9, at a much reduced ratio, thereby reducing the power necessary to rotate the drive shaft 17, and constituting a worm gear lock, preventing the weight of the loaded body from reversely rotating the gears, and thereby eliminating the necessity of stop devices such as ratchets.

Rigidly secured to the outer ends of the shaft 9, on each side of the casing 8, are crank arms 19, each carrying at its outer end a pivot pin 20, upon which is mounted a roller 21, adapted to fit into a track 22, defined by channel bars secured to the lower face on each side of the bottom of the truck body 4. Pivotally mounted on each of the pins 20, is a link 23, the other end of said link being pivotally secured at 24 to a lifting lever 25, fulcrumed at 26, in a bearing bracket 27, which latter extends forward to also provide a support for the shaft 9, as illustrated in Fig. 4. The free end of each lever 25 is provided with a roller 28, mounted on a pivot pin 29, and similar to the roller 21 carried by the arm 19, and, like said roller 21, the roller 28 also fits into the track 22 carried on the lower surface of the body 4.

In the operation of tilting the body 4 to dumping position, the shaft 9 is given a partial rotation, either by manually operated means applied to shaft 17 or by proper connections between the vehicle engine and said shaft. Such rotation of said shaft 9 causes the free ends of the crank arms 19 to swing upwardly, the rollers 21 carried thereby riding in the tracks 22 during such movement and initiating an upward swing of the body 4 around the pivotal point 5. Such movement causes the front end of the body 4 to be lifted away from the rollers 28, carried by the levers 25, but continued lift of the arms 19 causes an upward pull upon the levers 25 through the links 23, until the rollers 28 contact with the tracks 22, to exert a lift at a point adjacent the extreme front of the truck body. With the instrumentalities dimensioned and connected as herein illustrated, the body 4 is supported by the levers 25 and also by the arms 19 as shown in Fig. 4. Continued rotation of the shaft 9 however, causes the levers 25 to lift the body 4 entirely free of the arms 19, the pull on the levers being exerted through the links 23, until the body 4 reaches the maximum tilt, shown in Fig. 5.

It is to be here noted that the instrumentalities which apply the energy necessary to lift the loaded body, are, first, the arms 19, secured to the projecting ends of the shaft 9 at points far ahead of the pivotal axis of the body defined by the pivot pins 5, and, in this case, considerably in front of the center of gravity of the body 4, as illustrated in Fig. 4; secondly, the links 23, pivotally connected to the ends of the arms 19, and also pivoted to the levers 25, at points to the rear of the longitudinal centers of the latter, and, third, the levers 25, fulcrumed at points to the rear of shaft 9, but adapted to exert their initial lifting power at points near the front end of the body.

Prior to the lift of the body 4 to the positions shown in Figs. 4 and 5, as heretofore referred to, it will be noted that the rollers 21, carried by the arms 19, are located in the channels 22, near the front end of the body, as illustrated in Fig. 1, the initial lift therefore being applied to the front end of the body by the arms 19, less energy will be required of the prime mover because the force is being applied at a point far in front of the body hinging point, or pivots 5. During the initial swing of the arms 19 to lift the body 4, the links 23 pivot around the points of connection to the levers and the arms, until continued movement of the latter exerts a direct pull upon the levers 25 through the links 23, and under such pull continued rotation of the shaft 9 causes the body to be lifted by the arms 19 and levers 25, to the position illustrated in Fig. 4. Still further rotation of the shaft 9 causes the rollers 21, carried by the arms 19, to leave the channels 22, in describing arcs of a circle, simultaneously causing the links 23 to continue to pull the levers 25 upwardly and rearwardly, the levers 25 now carrying the entire weight of the load, it being obvious that rotation of the shaft 9 will cause the arms 19 to continuously pull the rollers 28 towards the rear of the channels, until the body 4 reaches its maximum tilt as shown in Fig. 5. In this position, or prior thereto, the end gate 29, pivoted at 30, is opened, and the load is dumped, a reverse rotation of the shaft 9 causing the body 4 to be lowered to normal position, the links 23 pushing on the levers 25, in this operation, as will be understood.

It is to be noted that, at the point where the levers 25 assume the weight of the load, the latter has been tilted sufficiently to bring the center of gravity considerably nearer to a vertical plane through axes of the body 4, and that continued lift of the body progressively decreases the lifting force required, as the center of gravity approaches said vertical plane. It will be seen therefore that, when the body 4 reaches the point where the levers 25 take up the load, the force required to elevate the body is considerably less than that required in the initial lift of the arms 19. But the arms 19 are much shorter than the levers 25, and the force is applied to the arms 19 at a point in front of the fulcrum point 26, of said levers. In other words the arms 19 are mounted at a point which is further from the pivotal axis than are the fulcrum points of the levers 25, and, due to the difference in position of such points, the angles of the links 23 are changed at all points of the pull.

In the complete tilting of the body the amount of arcuate travel of the arms 19 is greater at the beginning of the rise of the levers 25, the travel of said arms decreasing in proportion to the arcuate travel of the levers 25, as the front end of the body 4 is elevated. As the body tilts the center of gravity moves towards the rear of the vehicle and, therefore, towards the pivotal axis of the body, thereby decreasing the lifting effort in proportion to the angle of the lift, since the arcuate travel of the arms 19 decreases as the body 4 rises. It will therefore be apparent that, with the instrumentalities mounted as herein described, the force required is largely equalized throughout the complete tilting operation, from the initial lift imparted by the arms 19, and through the entire lift of the levers 25, to maximum. Mathematically expressed let:

A denote the arcuate movement of the body.

L denote the vertical resistance or load.

T denote the arcuate travel of arms 19.

F denote vertical force.—Then $$A \times L = T \times F.$$

When L is greatest at the beginning of the lift, T is also the greatest, which reduces F, and, while L is decreasing, due to the shift in center of gravity, T is also decreasing, allowing the force F to remain practically constant throughout the entire lifting operation.

The modified form of the invention illustrated in Figs. 6 and 7, shows a construction wherein the arms 19 and the levers 25 are both mounted on the ends of the shaft 9, the arms being fixed to the shaft, and the levers fulcrumed thereon, the links 23' being connected as shown and described in connection with the other views herein discussed. In this modified construction, all the advantages of my invention may be obtained with the exception that the force or effort required in the dumping operation is not so well equalized in the elevation of the body 4 from the minimum to the maximum tilt.

I claim:

1. Apparatus of the character described comprising, in combination with a support, a load-carrying body pivotally mounted thereon and a rotatable shaft located in front of the center of gravity of said body, an arm secured to said shaft and in contact with the lower surface of said body at a point near the portion remote from the pivot point of the latter, the outer end of said arm being adapted, under rotation of said shaft, to travel in an arcuate path, to initiate an upward tilting movement of said body, and thereafter move out of contact with the latter, a lever fulcrumed on said support at a point between said shaft and the pivot point of said body, and means operable to raise said lever into lifting contact with said body and, after the arm has passed out of contact with the body, to continuously apply the power of the rotating shaft to said lever in the elevation of the body to maximum tilt, said means comprising a link pivotally connected to said arm and to said lever.

2. Apparatus of the character described comprising, in combination with a support, a load-carrying body pivotally mounted thereon and a rotatable shaft located in front of the pivot point of said body, an arm secured to said shaft and in contact with the lower surface of said body at a point near the portion remote from the pivot point of the latter, the outer end of said arm being adapted, under rotation of said shaft, to travel in an arcuate path, to initiate an upward tilting movement of said body, and thereafter move out of contact with the latter, a lever fulcrumed on said support at a point between said shaft and the pivot point of said body, and means operable to raise said lever into lifting contact with said body and, after the arm has passed out of contact with the body, to continuously apply the power of the rotating shaft to said lever in the elevation of the body to maximum tilt, said means comprising a link pivotally secured to the free end of said arm and to a point on said lever in advance of its fulcrum.

3. Apparatus of the character described comprising, in combination with a support, a load-carrying body pivotally mounted on said support, and a rotatable shaft, an arm fixed at one end to said shaft and having its free end positioned below the lower portion of the body at a point remote from the point of pivotal connection of the latter, whereby rotation of the shaft will raise said arm and initiate a tilting movement of the body, and a lever fulcrumed to said support between said shaft and pivot point of said body, said lever being longer than said arm and having its free end positioned under said body at a point in advance of the free end of said arm, and a link pivotally connecting said arm to said lever, whereby, as the arm is causing an initial tilt of the body, the lever is being raised into contact with the latter, and, under the pull of the arm, continues the tilting movement of the body to maximum, after the arm has passed out of contact therewith.

4. In a dumping truck having a body pivoted at the rear of the truck frame, means for swinging the body to and from tilted position, comprising a driven shaft mounted transversely of said frame, crank arms fixed on the ends of said shaft with their free ends engageable with the body to initiate the tilting movement of said body, levers fulcrumed on the frame with their free ends engageable with the body at points in advance of those engaged by the crank arms, and links connecting the crank arms to said levers; whereby the levers will continue the tilting movement of the body after the crank arms have moved out of operative engagement with the body.

5. In a dumping truck having a body pivoted at the rear of the truck frame, means for swinging the body to and from tilted position, comprising a driven shaft mounted transversely of said frame, crank arms fixed on the ends of said shaft with their free ends engageable with the body forward of the shaft to initiate the tilting movement of said body, levers fulcrumed on the frame with their free ends engageable with the body at points in advance of those engaged by the crank arms, and links connecting the crank arms to said levers; whereby the levers will continue the tilting movement of the body after the crank arms have moved out of operative engagement with the body.

6. In a dumping truck having a body pivoted at the rear of the truck frame, means for swinging the body to and from tilted position, comprising a driven shaft mounted transversely of said frame in advance of the center of gravity of the body, crank arms fixed on the ends of said shaft with their free ends engageable with the body forward of the shaft to initiate the tilting movement of said body, levers fulcrumed on the frame with their free ends engageable with the body at points in advance of those engaged by the crank arms, and links connecting the crank arms to said levers; whereby the levers will continue the tilting movement of the body after the crank arms have moved out of operative engagement with the body.

7. In a dumping truck having a body pivoted at the rear of the truck frame, means for swinging the body to and from tilted position, comprising a driven shaft mounted transversely of said frame in advance of the center of gravity of the body, crank arms fixed on the ends of said shaft with their free ends engageable with the body forward of the shaft to initiate the tilting movement of said body, levers fulcrumed on the frame to the rear of said shaft with their free ends engageable with the body at points in advance of those engaged by the crank arms, and links connecting the crank arms to said levers; whereby the levers will continue the tilting movement of the body after the crank arms have moved out of operative engagement with the body.

8. In a dumping truck having a body pivoted at the rear of the truck frame, means for swinging the body to and from tilted position, comprising a driven shaft mounted transversely of said frame, crank arms fixed on the ends of said shaft with their free ends engageable with the body to initiate the tilting movement of said body, levers fulcrumed on the frame with their free ends engageable with the body at points in advance of those engaged by the crank arms, links connecting the crank arms to said levers, and reducing gearing for driving said shaft; whereby the levers will continue the tilting movement of the body after the crank arms have moved out of operative engagement with the body.

In testimony whereof I affix my signature.

RUSH S. HARTMAN.